No. 772,930. PATENTED OCT. 25, 1904.
B. GASTAL.
VEHICLE WHEEL.
APPLICATION FILED NOV. 18, 1903.
NO MODEL.

WITNESSES:

INVENTOR
Benjamin Gastal
BY
ATTORNEYS

No. 772,930. Patented October 25, 1904.

UNITED STATES PATENT OFFICE.

BENJAMIN GASTAL, OF PELOTAS, BRAZIL.

VEHICLE-WHEEL.

SPECIFICATION forming part of Letters Patent No. 772,930, dated October 25, 1904.

Application filed November 18, 1903. Serial No. 181,645. (No model.)

*To all whom it may concern:*

Be it known that I, BENJAMIN GASTAL, a citizen of the Republic of Brazil, and a resident of Pelotas, Brazil, have invented a new and Improved Vehicle-Wheel, of which the following is a full, clear, and exact description.

The object of the invention is to provide a new and improved wheel which is simple and durable in construction, more especially designed for use on railroad-cars, street-cars, wagons, and other vehicles, and arranged to reduce the noise and the vibration incident to the wheel traveling on the rail or road to a minimum.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1:
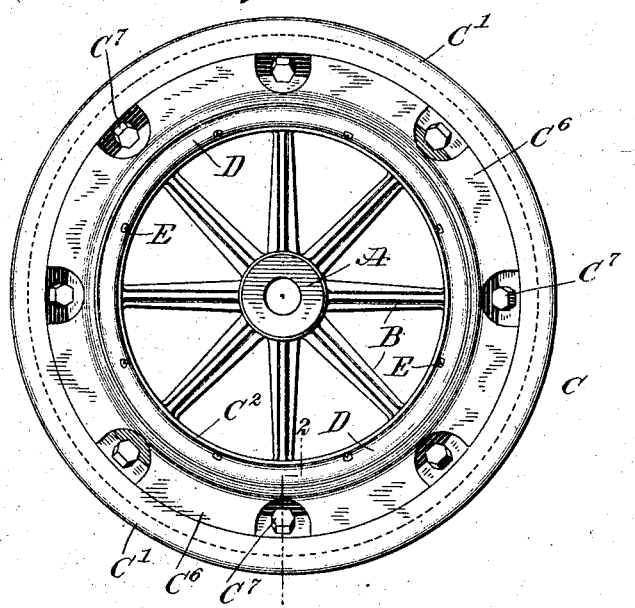
Figure 2:
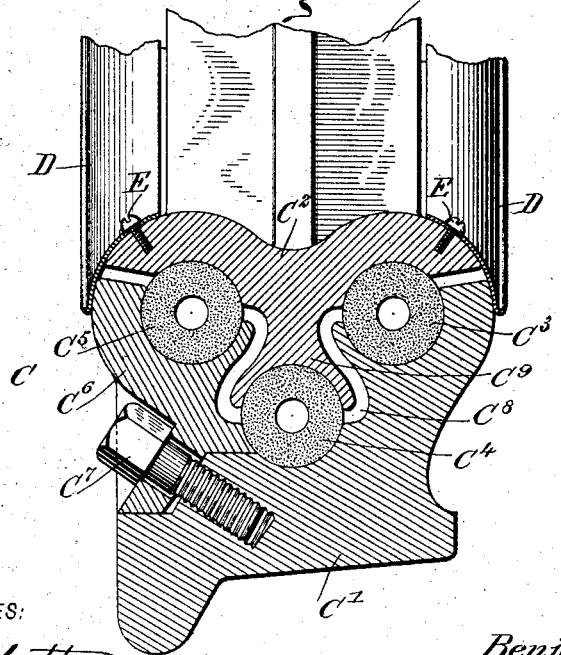

Figure 1 is a face view of the improvement, and Fig. 2 is an enlarged transverse section of the same on the line 2 2 of Fig. 1.

The wheel consists of a hub A, a web or spokes B, and a rim C, of which the rim is formed of a tread $C'$, a spoke-section $C^2$, rigidly attached to the web or spokes B, and a plurality of cushions in the form of pneumatic tubes $C^3$, $C^4$, and $C^5$, interposed between the tread $C'$ and the web or spokes B.

The tread $C'$ is provided with a removable side $C^6$, normally fastened in place by screws $C^7$ or other fastening devices, and the said sides $C^6$ when removed allows of readily placing the tread $C'$ in proper position relative to the spoke-section $C^2$, and when the parts are removed the side $C^6$ is placed in position and fastened to the tread $C'$ by the screws $C^7$. The tread $C'$ is formed at the middle of its inner side with an annular recess $C^8$, into which projects the vertical member $C^9$ of the spoke-section $C^2$, preferably made in the form of a T in cross-section, as plainly indicated in Fig. 2. Now by reference to this figure it will be seen that the pneumatic tubes $C^3$ and $C^5$ are arranged between the sides of the tread $C'$ and the sides of the spoke-section $C^2$, while the pneumatic tube $C^4$ is seated in the bottom of the recess $C^8$ and engaged by the end of the vertical member $C^9$ of the spoke-section.

The tread $C'$ and the spoke-section $C^2$ are spaced a sufficient distance apart, so that they are not liable to contact, and hence all vibration incident to the tread $C'$ traveling on the rails or other supports is readily taken up by the pneumatic tubes $C^3$, $C^4$, and $C^5$, which also reduce the noise incident to the contact of the wheel with the rails to a minimum. The outer ends of the open joints between the tread $C'$ and the spoke-section $C^2$ are covered by suitable annular covering-flaps D, fastened by screws or other devices E to the spoke-section $C^2$.

By arranging the pneumatic tubes $C^3$, $C^4$, and $C^5$ in the manner described and shown in Fig. 2 it is evident that the sections of the rim are not liable to become disconnected in a transverse direction, especially as the said pneumatic tubes are partly seated in seats in the tread $C'$ and in seats in the spoke-section $C^2$.

Having thus described my invention, I claim as new and desire to secure by Letters Patent—

1. A vehicle-wheel having a rim consisting of a spoke-section, a tread formed of sections having correspondingly-shaped inner faces, and a plurality of cushions interposed and bearing between the spoke-section and the inner faces of the sections of the tread, as set forth.

2. A vehicle-wheel having a rim consisting of a tread provided with a removable side, a spoke-section attached to the spokes of the wheel and spaced from the tread, and cushions interposed between the said tread and spoke section, the cushions being in the form of pneumatic tubes, as set forth.

3. A vehicle-wheel having a rim consisting of a tread, a spoke-section attached to the spokes of the wheel and spaced from the said tread, cushions interposed between the said tread and the spoke-section, and covering-plates over the outer ends of the open joint between the said tread and the spoke-section, as set forth.

4. A vehicle-wheel comprising a hub, a web integrally connected with the hub, and a rim consisting of a tread having an annular recess at its inner face, a spoke-section approximately T-shaped in cross-section and having its vertical member extending into the said recess and cushions interposed between the said tread and the spoke-section, at the sides and middle thereof, as set forth.

5. A vehicle-wheel comprising a hub, a web integrally connected with the hub, and a rim consisting of a tread having an annular recess at its inner face, a spoke-section approximately T-shaped in cross-section and having its vertical member extending into the said recess and cushions interposed between the said tread and the spoke-section, at the sides and middle thereof, the said tread having a removable side for conveniently assembling the parts of the rim, as set forth.

6. A vehicle-wheel having a rim consisting of an inner or spoke section provided with the side portions and the intermediate outwardly-projecting member, the tread having inwardly-projecting side members extending on opposite sides of the intermediate projecting member of the spoke-section, and cushions bearing between the side portions of the spoke and tread sections and between the intermediate projecting member of the spoke-section and the tread-section substantially as set forth.

7. In a vehicle-wheel the combination with the inner or spoke section of the rim and the outer or tread section, said sections having opposing side portions and intermediate interlocking portions, and intermediate cushions bearing between the said side and intermediate portions substantially as set forth.

In testimony whereof I have signed my name to this specification in the presence of two subscribing witnesses.

BENJAMIN GASTAL.

Witnesses:
PIETRO PIRU Y PITA,
HERMANN KRÜGER.